US012278440B2

(12) United States Patent
Huang et al.

(10) Patent No.: US 12,278,440 B2

(45) Date of Patent: Apr. 15, 2025

(54) ELECTRIC CONNECTOR AND ASSEMBLY THEREOF WITH IMPROVED MOUNTING FEATURES

(71) Applicant: DONGGUAN LUXSHARE TECHNOLOGIES CO., LTD, Dongguan (CN)

(72) Inventors: Bin Huang, Dongguan (CN); Rongzhe Guo, Dongguan (CN); Hongji Chen, Dongguan (CN); Huanhuan Shen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 401 days.

(21) Appl. No.: 17/752,545

(22) Filed: May 24, 2022

(65) Prior Publication Data

US 2022/0384970 A1 Dec. 1, 2022

(30) Foreign Application Priority Data

May 28, 2021 (CN) ......................... 202121181522.8

(51) Int. Cl.

| | |
|---|---|
| ***H01R 13/40*** | (2006.01) |
| ***H01R 12/70*** | (2011.01) |
| ***H01R 13/502*** | (2006.01) |
| ***H01R 13/516*** | (2006.01) |
| ***H01R 13/629*** | (2006.01) |
| ***H01R 13/6581*** | (2011.01) |

(52) U.S. Cl.

CPC ....... *H01R 12/7064* (2013.01); *H01R 13/502* (2013.01); *H01R 13/516* (2013.01); *H01R 13/629* (2013.01); *H01R 13/6581* (2013.01)

(58) Field of Classification Search

CPC . H01R 12/7064; H01R 13/502; H01R 12/724

See application file for complete search history.

(56) References Cited

U.S. PATENT DOCUMENTS 3,587,029 A * 6/1971 Knowles ............ H01R 13/6471 439/514
4,686,607 A * 8/1987 Johnson ............... H01R 12/716 361/791
5,397,241 A * 3/1995 Cox ..................... H01R 12/737 439/63

(Continued)

*Primary Examiner* — Neil Abrams

(74) *Attorney, Agent, or Firm* — Birch, Stewart, Kolasch & Birch, LLP

(57) ABSTRACT

An electrical connector includes an insulating body, a number of first conductive terminals and a number of second conductive terminals. Each first conductive terminal includes a first mating arm. Each second conductive terminal includes a second mating arm and a second press-fit portion for being mounted to a circuit board. Among the second conductive terminals, the second press-fit portions corresponding to any two adjacent second mating arms are arranged in a staggered manner with each other along a second arrangement direction of the second mating arms. Therefore, it effectively avoids the mutual influence between the second press-fit portions, and facilitates the realization of the installation with the circuit board. The present disclosure also discloses an electrical connector assembly having the electrical connector.

17 Claims, 12 Drawing Sheets

(56) References Cited

U.S. PATENT DOCUMENTS

| | | | | | |
|---|---|---|---|---|---|
| 5,586,915 | A * | 12/1996 | Baker | H01R 12/82 | 439/924.1 |
| 6,592,401 | B1 * | 7/2003 | Gardner | H01R 12/716 | 439/924.1 |
| 6,824,426 | B1 * | 11/2004 | Spink, Jr. | H01R 13/5845 | 439/579 |
| 6,899,564 | B2 * | 5/2005 | Lee | H01R 43/18 | 439/378 |
| 7,833,068 | B2 * | 11/2010 | Bright | H01R 13/502 | 439/733.1 |
| 8,535,069 | B2 * | 9/2013 | Zhang | H01R 13/6471 | 439/607.05 |
| 11,251,573 | B2 | 2/2022 | Wu et al. | | |
| 11,646,513 | B2 * | 5/2023 | Huang | H01R 13/405 | 439/634 |

* cited by examiner

ELECTRIC CONNECTOR AND ASSEMBLY THEREOF WITH IMPROVED MOUNTING FEATURES

CROSS-REFERENCE TO RELATED APPLICATION

This patent application claims priority of a Chinese Patent Application No. 202121181522.8, filed on May 28, 2021 and titled "ELECTRIC CONNECTOR AND ASSEMBLY THEREOF", the entire content of which is incorporated herein by reference.

TECHNICAL FIELD

The present disclosure relates to an electrical connector and an assembly thereof, and more particularly to a high-speed electrical connector and an assembly thereof.

BACKGROUND

As the transmission rate of electrical connectors continues to increase, the transmission of high-speed signals in circuit boards is facing technical and cost challenges. In addition, when an electrical connector is mounted to a circuit board, especially when the electrical connector and the circuit board are mounted back to back, how to simplify the system structure, save space, and save the number of peripheral components are also technical problems faced by those skilled in the art.

SUMMARY

An object of the present disclosure is to provide an electrical connector and an assembly thereof which are more convenient to be mounted to a circuit board.

In order to achieve the above object, the present disclosure adopts the following technical solution: an electrical connector, including: an insulating body, the insulating body including a mating surface and a mating slot extending through the mating surface; a plurality of first conductive terminals, each first conductive terminal including a first mating arm extending into the insulating body, the first mating arm including a first mating portion extending into the mating slot; a plurality of second conductive terminals, each second conductive terminal including a second mating arm extending into the insulating body and a press-fit portion for being mounted to a circuit board, the second mating arm including a second mating portion extending into the mating slot, the first mating portion and the second mating portion being adapted to clamp a tongue plate of a mating connector so as to electrically contact with the mating connector; wherein the plurality of second conductive terminals are arranged along an arrangement direction; and wherein any two adjacent second mating arms are aligned with each other along the arrangement direction, and any two adjacent press-fit portions are arranged in a staggered manner along the arrangement direction.

In order to achieve the above object, the present disclosure adopts the following technical solution: an electrical connector assembly, including: a circuit board; a first electrical connector; and a second electrical connector, the first electrical connector and the second electrical connector being mounted to opposite sides of the circuit board; each of the first electrical connector and the second electrical connector including: an insulating body, the insulating body including a mating surface and a mating slot extending through the mating surface; a plurality of first conductive terminals, each first conductive terminal including a first mating arm extending into the insulating body, the first mating arm including a first mating portion extending into the mating slot; a plurality of second conductive terminals, each second conductive terminal including a second mating arm extending into the insulating body and a press-fit portion for being mounted to a circuit board, the second mating arm including a second mating portion extending into the mating slot, the first mating portion and the second mating portion being adapted to clamp a tongue plate of a mating connector so as to electrically contact with the mating connector; wherein the plurality of second conductive terminals are arranged along an arrangement direction; and wherein any two adjacent second mating arms are aligned with each other along the arrangement direction, and any two adjacent press-fit portions are arranged in a staggered manner along the arrangement direction; and wherein the press-fit portions of the first electrical connector and the press-fit portions of the second electrical connector located in a same plane are arranged in a staggered manner along the arrangement direction.

Compared with the prior art, the present disclosure can effectively avoid the mutual influence between the second press-fit portions by arranging any two adjacent second press-fit portions in a staggered manner along the arrangement direction, thereby facilitating the installation with the circuit board. When the electrical connector and the circuit board of the present disclosure adopt a back-to-back installation manner, the staggered second press-fit portions facilitate the installation of the first electrical connector and the second electrical connector with the circuit board.

DETAILED DESCRIPTION

Figure 1:
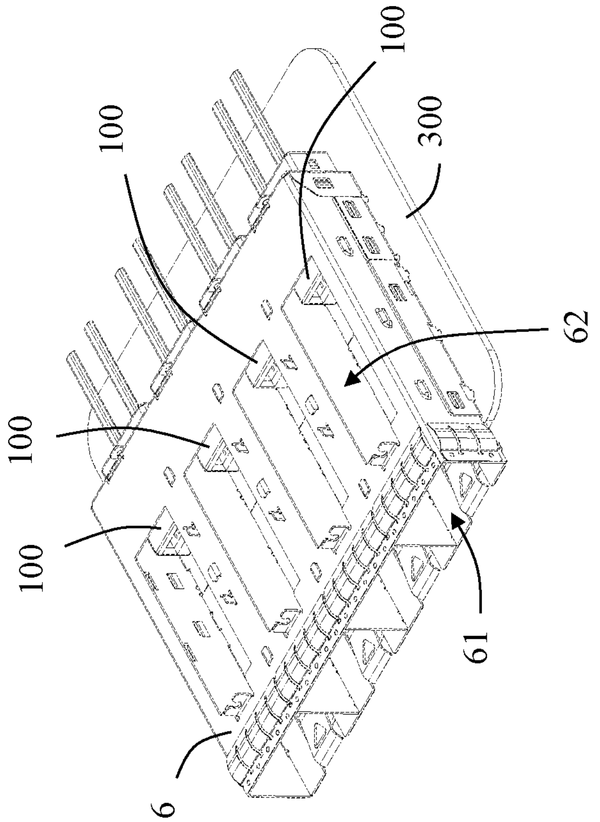
FIG. 1 is a perspective schematic view of an electrical connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 4, the present disclosure discloses an electrical connector assembly including a circuit board 300, at least one first electrical connector 100 mounted to one side (i.e., an upper side) of the circuit board 300, and at least one second electrical connector 200 mounted to the other side (i.e., a lower side) of the circuit board 300. In an illustrated embodiment of the present disclosure, the at least one first electrical connector 100 and the at least one second electrical connector 200 are substantially aligned and installed along a thickness direction of the circuit board 300, that is, a back-to-back installation, so as to utilize an area of the circuit board 300 to a greater extent.

Figure 2:
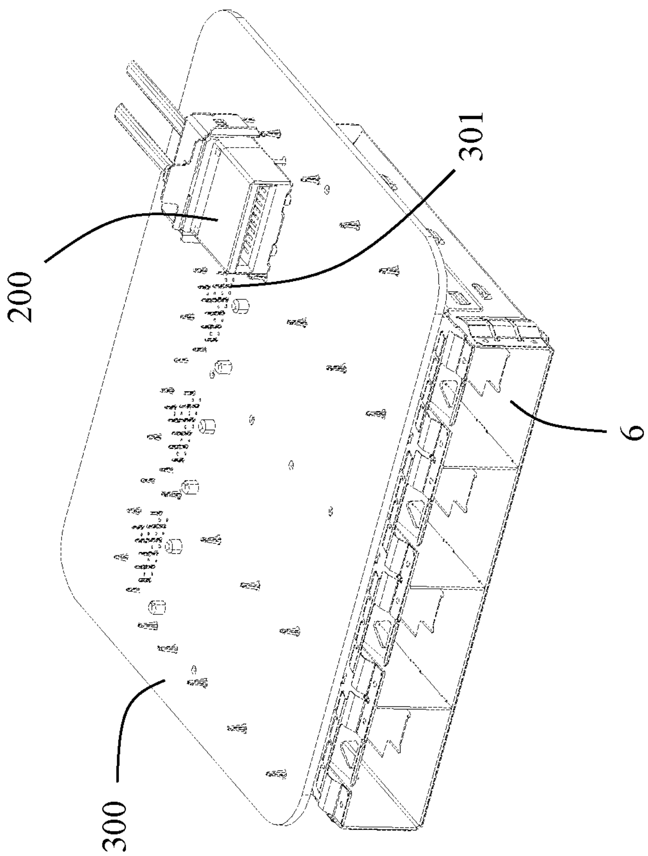
FIG. 2 is a perspective schematic view of FIG. 1 from another angle.
Figure 3:
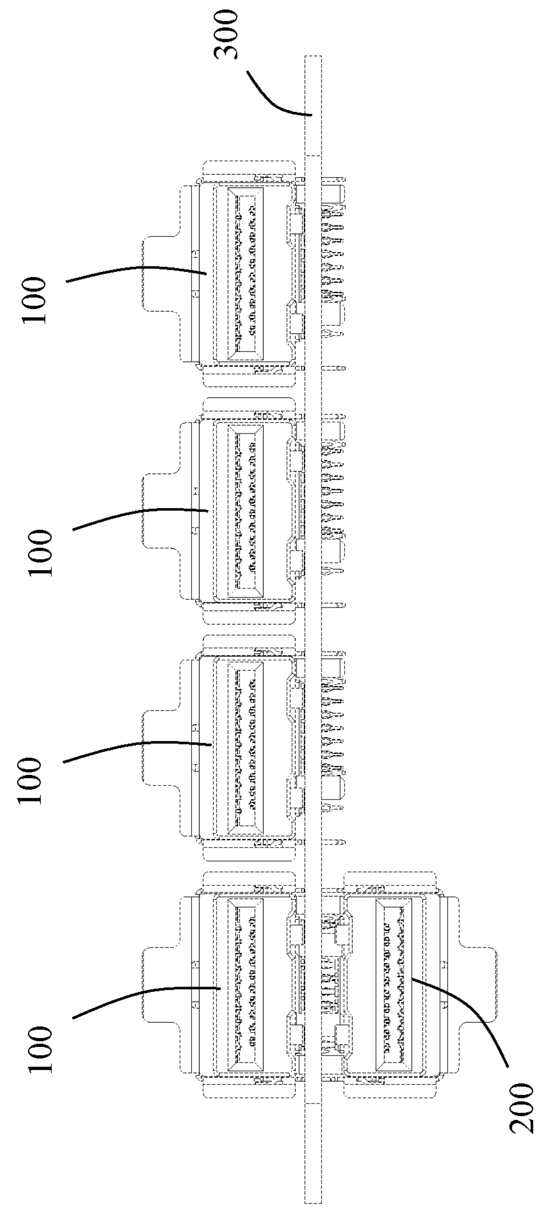
FIG. 3 is a front view of the electrical connector assembly in FIG. 1 after removing a metal cage.
Figure 4:
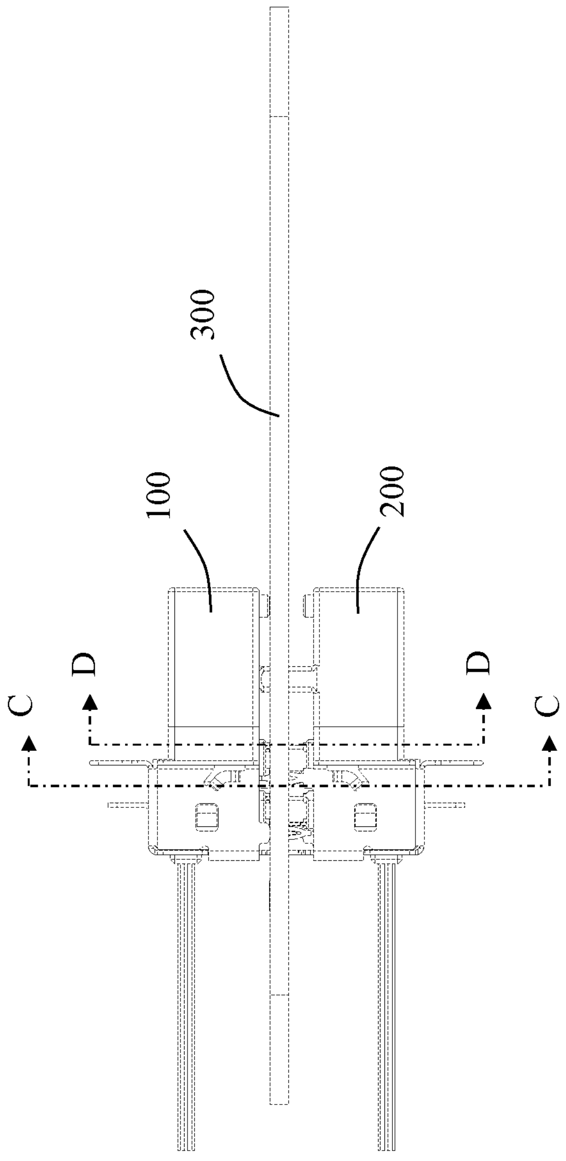
FIG. 4 is a side view of FIG. 3.
Figure 5:
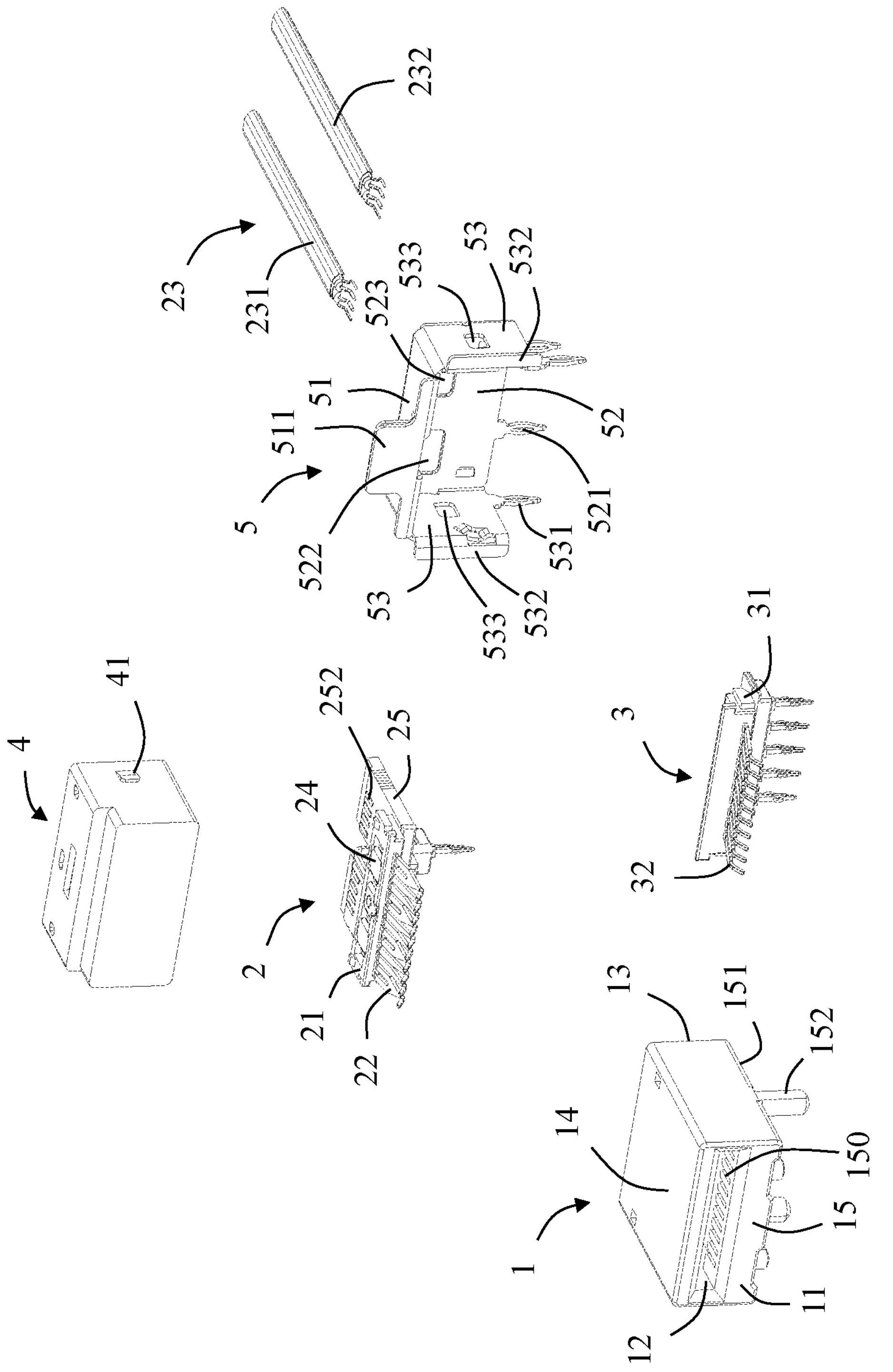
FIG. 5 is a partial perspective exploded view of an electrical connector of the present disclosure.
Figure 6:
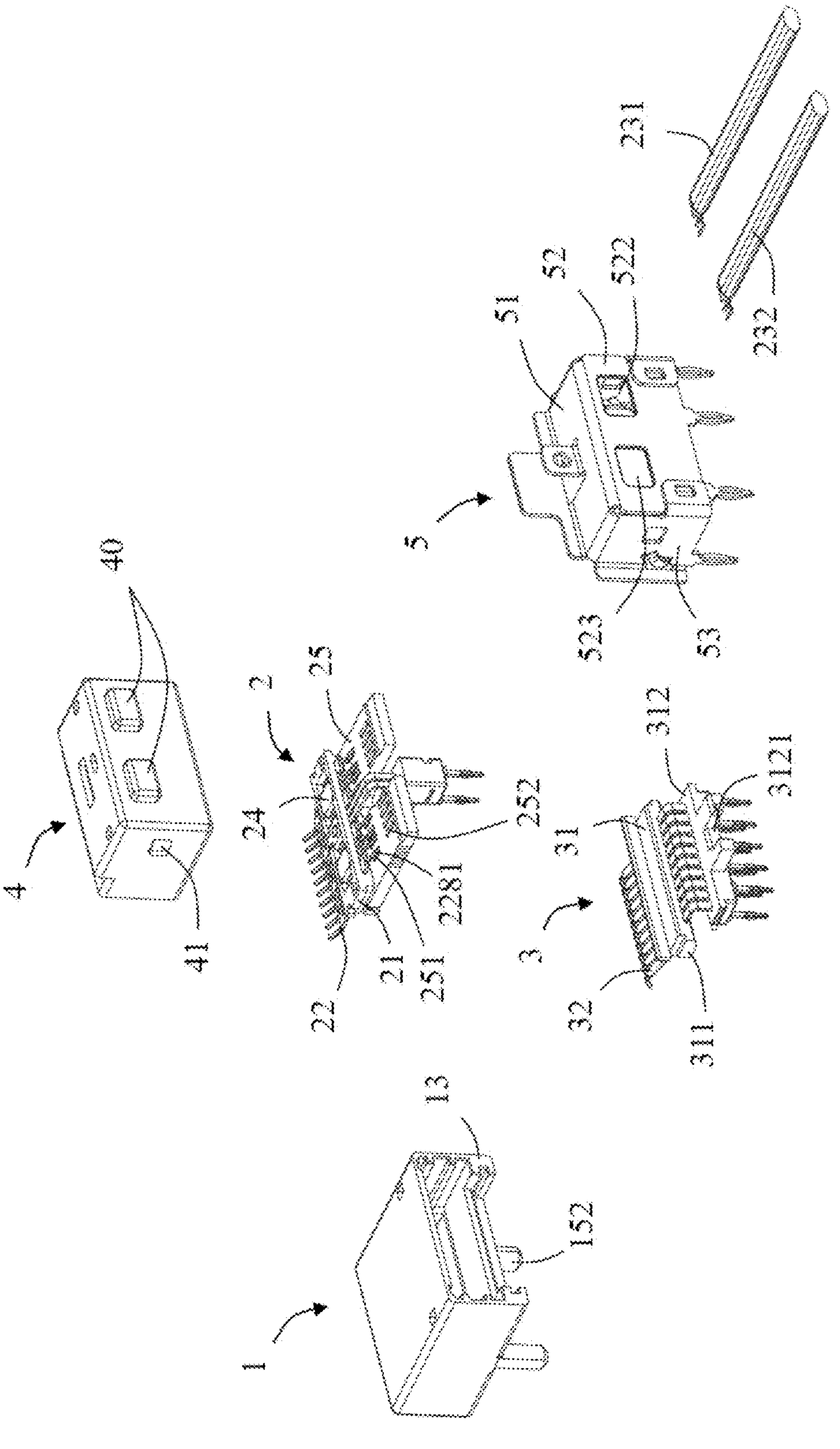
FIG. 6 is a partially exploded perspective view of FIG. 5 from another angle.
Figure 7:
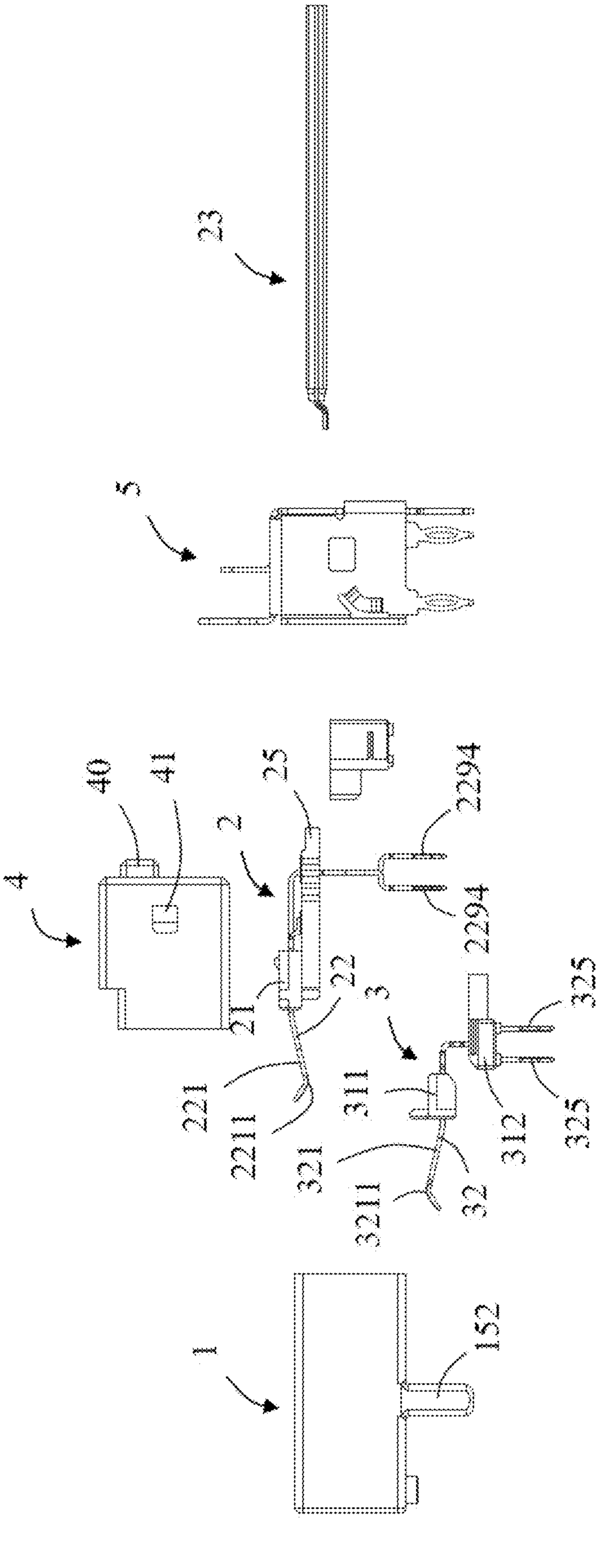
FIG. 7 is a side view of the electrical connector of the present disclosure after being partially disassembled.
Figure 8:
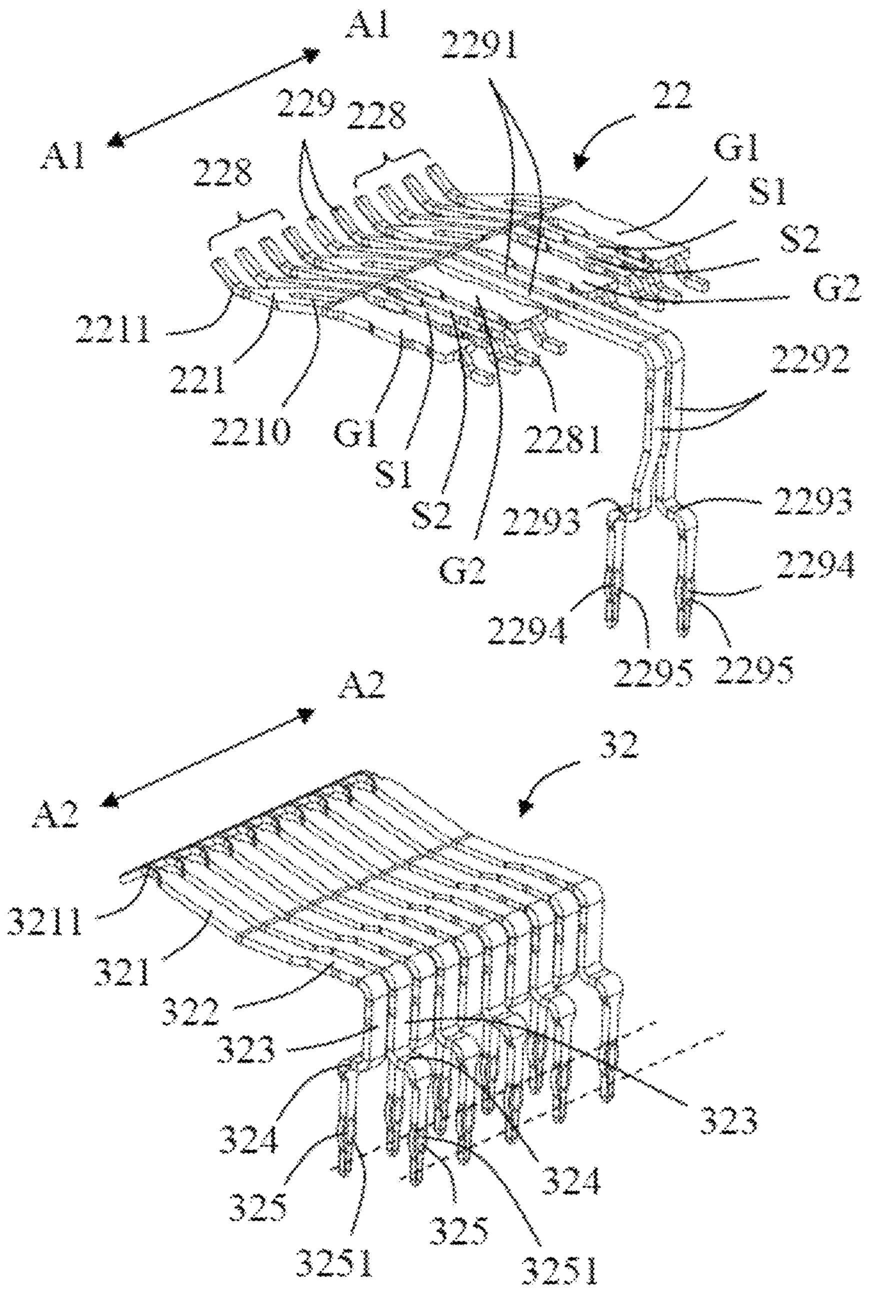
FIG. 8 is a perspective schematic view of first conductive terminals and second conductive terminals.
Figure 9:
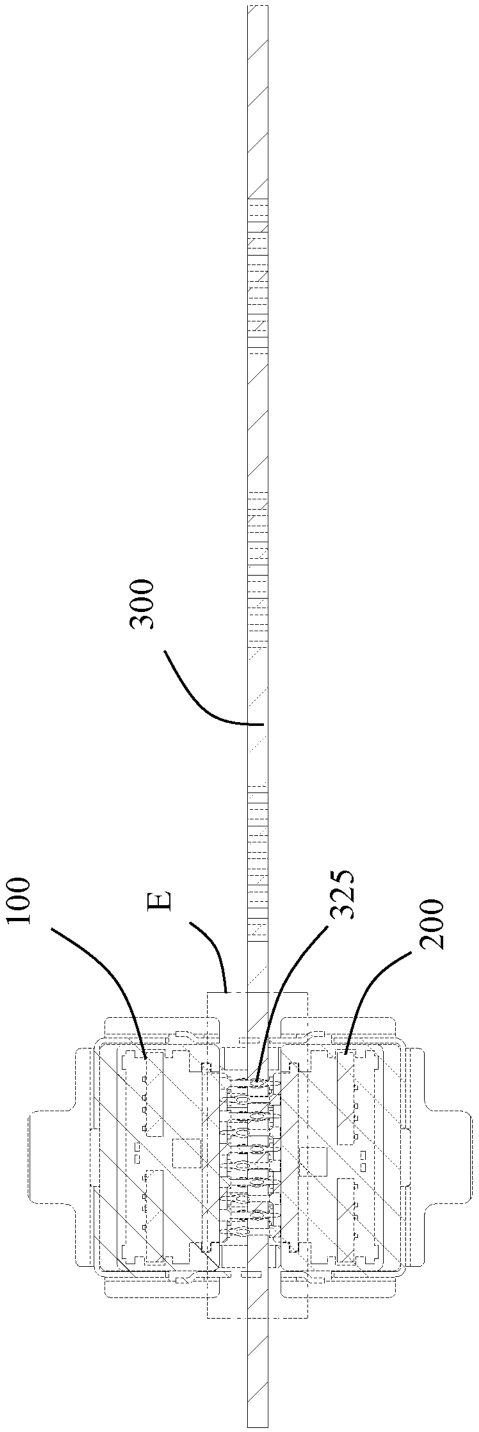
FIG. 9 is a schematic cross-sectional view taken along line C-C in FIG. 4.
Figure 10:
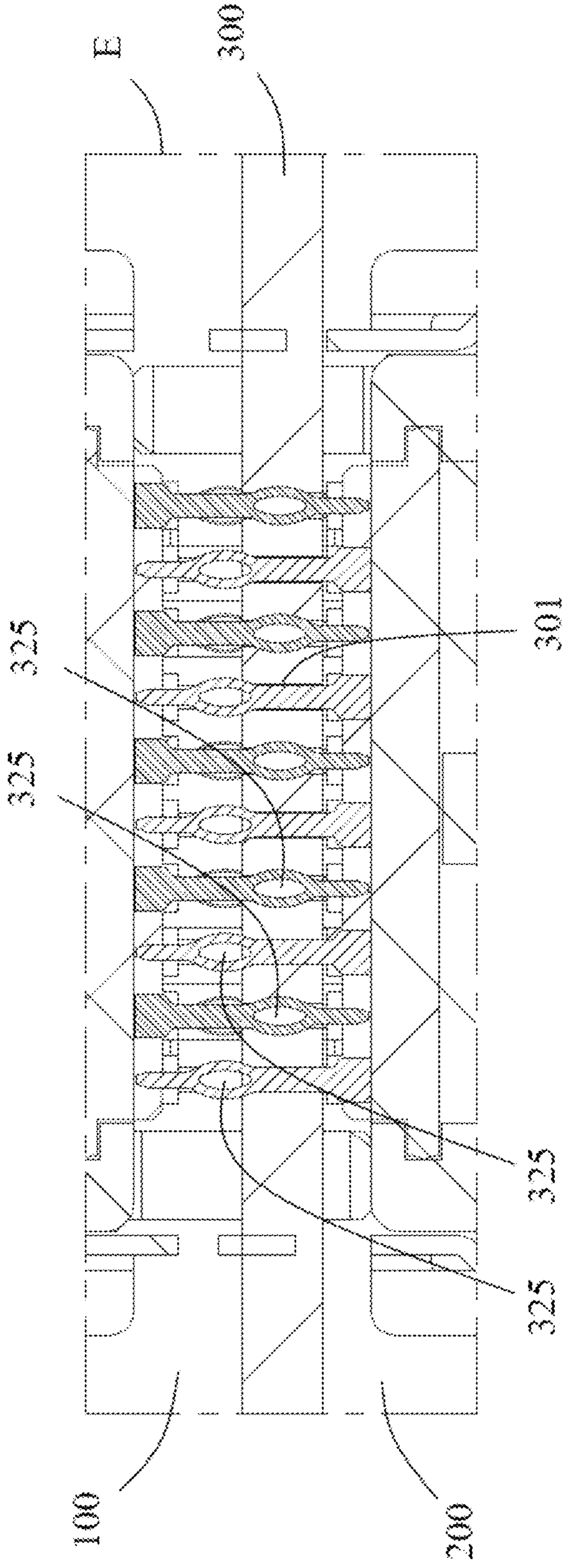
FIG. 10 is a partial enlarged view of a frame part E in FIG. 9.
Figure 11:
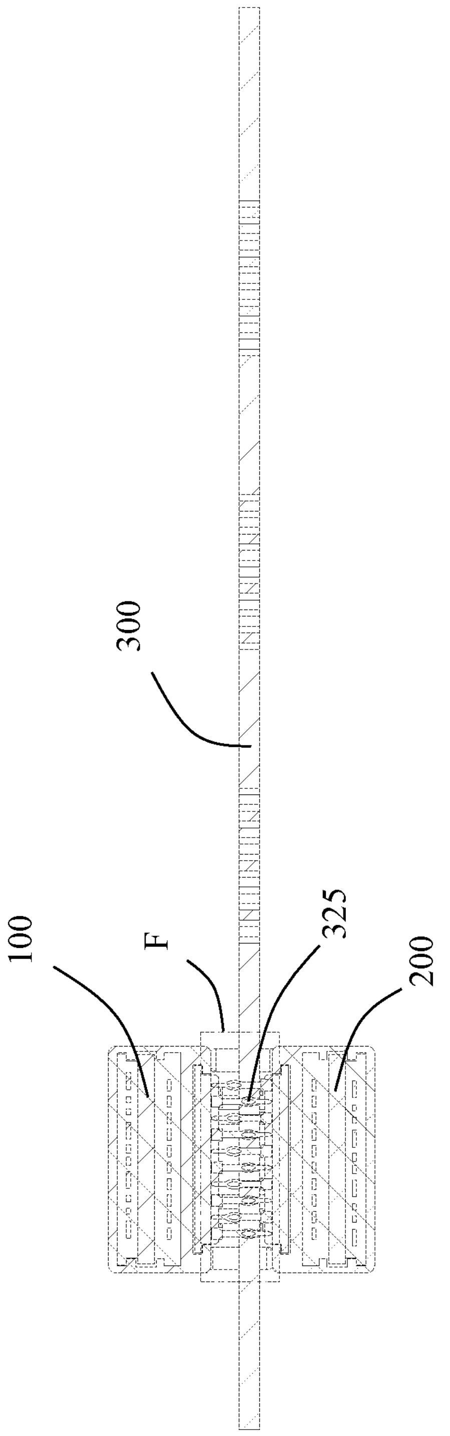
FIG. 11 is a schematic cross-sectional view taken along line D-D in FIG. 4.
Figure 12:
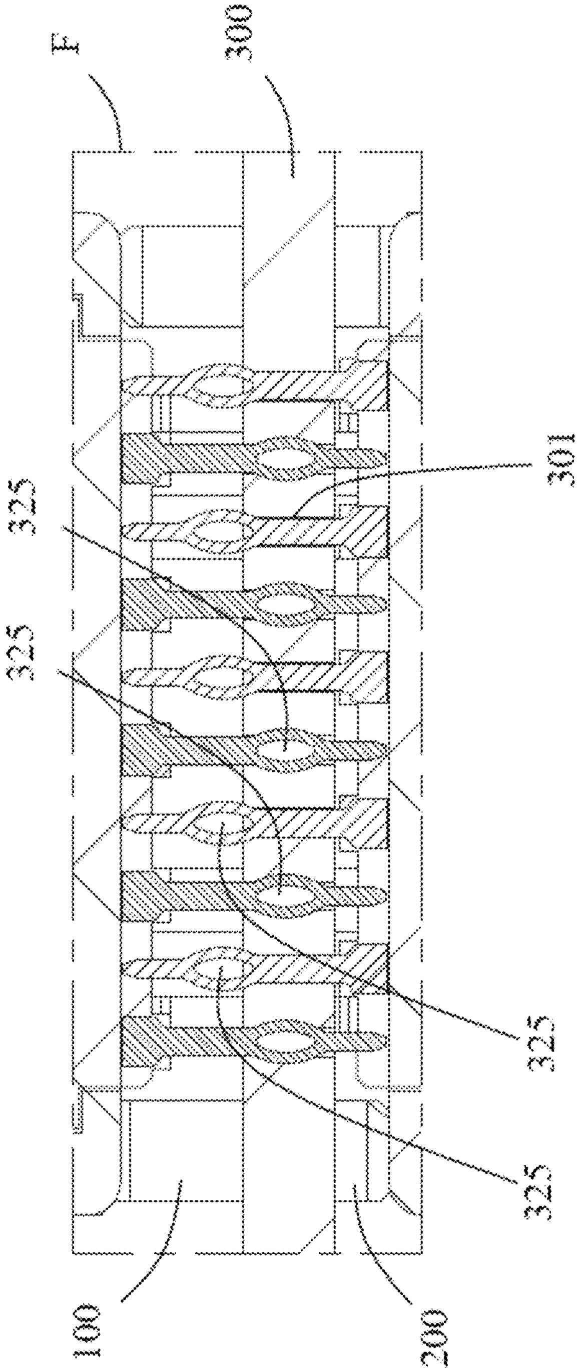
FIG. 12 is a partial enlarged view of a frame part F in FIG. 11.

Referring to FIGS. 2, 10 and 12, in the illustrated embodiment of the present disclosure, the circuit board 300 includes a plurality of conductive holes 301 extending through the circuit board 300 along the thickness direction. The first electrical connector 100 and the second electrical connector 200 are electrically connected to the circuit board 300 via the conductive holes 301.

In the illustrated embodiment of the present disclosure, the first electrical connector 100 and the second electrical connector 200 have the same structure. Preferably, the first electrical connector 100 and the second electrical connector 200 can be shared for saving costs. Each of the first electrical connector 100 and the second electrical connector 200 is referred to as an electrical connector. The following only takes one of the electrical connectors as an example for detailed description.

Referring to FIGS. 5 to 8, in the illustrated embodiment of the present disclosure, the electrical connector includes an insulating body 1, a first terminal module 2, a second terminal module 3, an over-molding insulating block 4, a metal shield 5 and a metal cage 6.

The insulating body 1 includes a mating surface 11, a mating slot 12 extending through the mating surface 11, an installation surface 13 opposite to the mating surface 11, a top wall 14 located on top of the mating slot 12, and a bottom wall 15 located at a bottom of the mating slot 12. The mating slot 12 is adapted to receive a tongue plate (not shown) of a mating connector. The top wall 14 defines a plurality of first installation grooves (not shown, referring to second installation grooves 150 below) communicating with the mating slot 12. The first installation grooves are arranged at intervals along a left-right direction. The bottom wall 15 defines a plurality of second installation grooves 150 communicating with the mating slot 12. The second installation grooves 150 are arranged at intervals along the left-right direction. In addition, the bottom wall 15 includes a mounting surface 151 for being mounted to the circuit board 300. The insulating body 1 further includes at least one positioning post 152 extending downwardly and protruding beyond the mounting surface 151. The positioning post 152 is adapted for being inserted and positioned in the circuit board 300.

In the illustrated embodiment of the present disclosure, the first terminal module 2 includes a first insulating block 21, a plurality of first conductive terminals 22 fixed to the first insulating block 21, and a plurality of cables 23 directly or indirectly connected to at least parts of the first conductive terminals 22. In an embodiment of the present disclosure, the first conductive terminals 22 are insert-molded with the first insulating block 21. Each first conductive terminal 22 includes a first mating arm 221. The first mating arm 221 extends beyond the first insulating block 21 and extends into the corresponding first installation groove of the insulating body 1. By providing the first installation grooves, the first mating arms 221 can be spaced apart from each other, thereby facilitating better positioning of each first mating arm 221. Each first mating arm 221 includes a first mating portion 2211 protruding downwardly into the mating slot 12. The first mating arms 221 of the plurality of first conductive terminals 22 are arranged in a single row along a first arrangement direction A1 (for example, the left-right direction) of the first mating arms 211.

The plurality of first conductive terminals 22 include a plurality of groups of signal terminals 228 and a plurality of non-signal terminals 229 (for example, power terminals, etc.). In the illustrated embodiment of the present disclosure, the plurality of groups of signal terminals 228 are two groups of signal terminals. Each group of signal terminals include a first ground terminal G1, a second ground terminal G2, and a pair of differential signal terminals S1, S2 located between the first ground terminal G1 and the second ground terminal G2. Each of the signal terminals 228 and the non-signal terminals 229 is provided with the first mating arm 221. The first mating arm 221 of each of the first ground terminal G1 and the second ground terminal G2 further includes a first slot 2210 extending along a mating direction (for example, a front-rear direction). In the illustrated embodiment of the present disclosure, a width of the first mating arm 221 of each of the first ground terminal G1 and the second ground terminal G2 is larger than a width of the first mating arm 221 of remaining first conductive terminals 22, thereby a better grounding shielding effect can be achieved and the transmission quality of high-speed signals can be improved. In the illustrated embodiment of the present disclosure, the first terminal module 2 further includes a ground connection piece 24. The ground connection piece 24 is in contact with the first ground terminals G1 and the second ground terminals G2 to connect all the first ground terminals G1 and the second ground terminals G2 in series so as to form a grounding piece with a larger area. Each signal terminal 228 includes a tail portion 2281 electrically connected to the corresponding cable 23 directly or indirectly. In the illustrated embodiment of the present disclosure, the tail portion 2281 of each signal terminal 228 is electrically connected to the corresponding cable 23 indirectly. Specifically, in the illustrated embodiment of the present disclosure, the first terminal module 2 further includes a transfer circuit board 25. The transfer circuit board 25 includes a first row of conductive pads 251 and a second row of conductive pads 252 electrically connected with the first row of conductive pads 251. The first row of conductive pads 251 are connected to the tail portions 2281 of the group of signal terminals 228, for example by soldering. The second row of conductive pads 252 are connected to the plurality of cables 23, for example by soldering. Of course, in other embodiments, the tail portions 2281 may also be directly connected to the cables 23 through other structures and/or other connection methods.

Each non-signal terminal 229 includes a first extension portion 2291 connected to the first mating arm 221, a second extension portion 2292 bent from the first extension portion 2291, a first bending portion 2293 bent from the second extension portion 2292, and a first press-fit portion 2294 extending from the first bending portion 2293. In two adjacent non-signal terminals 229, bending directions of the two first bending portions 2293 are opposite (for example, one is bent forwardly and the other is bent backwardly), so that the two first press-fit portions 2294 are arranged in a staggered manner with each other along the first arrangement direction A1. This staggered arrangement is beneficial to reduce the mutual interference between the first press-fit portions 2294, and is convenient to press the first press-fit portions 2294 into the conductive holes 301 of the circuit board 300. In the illustrated embodiment of the present disclosure, each first press-fit portion 2294 defines a first oval hole 2295 so that the first press-fit portion 2294 has a certain elasticity. Therefore, it is convenient to press the first press-fit portion 2294 into the conductive hole 301 of the circuit board 300 to achieve a reliable electrical connection with the circuit board 300.

The second terminal module 3 includes a second insulating block 31 and a plurality of second conductive terminals 32 fixed to the second insulating block 31. In an embodiment of the present disclosure, the second conductive terminals 32 are insert-molded with the second insulating block 31. Each of the second conductive terminals 32 includes a second mating arm 321, a first fixing portion 322 connected to the second mating arm 321, a second fixing portion 323 bent from the first fixing portion 322, a second bending portion 324 bent from the second fixing portion 323, and a second press-fit portion 325 extending from the second bending portion 324. The second mating arm 321 and the second press-fit portion 325 protrude beyond opposite sides of the second insulating block 31, respectively. The second mating arm 321 protrudes beyond the second insulating block 31 and extends into the corresponding second installation groove 150 of the insulating body 1. By providing the second installation grooves 150, the second mating arms 321 can be spaced apart, thereby facilitating better positioning of each second mating arm 221. The second mating arm 321 includes a second mating portion 3211 protruding into the mating slot 12. The first mating portion 2211 and the second mating portion 3211 are adapted to clamp the tongue plate of the mating connector so as to make electrical contact with the mating connector. In the illustrated embodiment of the present disclosure, any two adjacent first fixing portion 322 and second fixing portion 323 are aligned with each other in a second arrangement direction A2. Bending directions of any two adjacent second bending portions 324 are opposite. In the illustrated embodiment of the present disclosure, the first mating portion 2211 and the second mating portion 3211 are both arc-shaped. The first mating portion 2211 protrudes toward the second mating portion 3211, and the second mating portion 3211 protrudes toward the first mating portion 2211 so as to improve the clamping effect when clamping the tongue plate.

The plurality of second conductive terminals 32 are arranged along the second arrangement direction A2 (for example, the left-right direction). Any two adjacent second mating arms 321 are aligned with each other along the second arrangement direction A2. Any two adjacent second press-fit portions 325 are arranged in a staggered manner with each other along the second arrangement direction A2. In some expressions in the present disclosure, the second arrangement direction A2 is also referred to as one arrangement direction. The first arrangement direction A1 is correspondingly referred to as another arrangement direction. In the illustrated embodiment of the present disclosure, the first arrangement direction A1 and the second arrangement direction A2 are parallel to each other. The second mating arms 321 of the plurality of second conductive terminals 32 are arranged in a single row along the second arrangement direction A2. In the plurality of second conductive terminals 32, the second press-fit portions 325 corresponding to any two adjacent second mating arms 321 are arranged in a staggered manner with each other along the second arrangement direction A2. In the illustrated embodiment of the present disclosure, the second press-fit portions 325 of the plurality of second conductive terminals 32 are arranged in two rows along the second arrangement direction A2. Through this staggered arrangement of the second press-fit portions 325, this is beneficial to reduce the mutual interference between the second press-fit portions 325, and it is convenient to press the second press-fit portions 325 into the conductive holes 301 of the circuit board 300. In the illustrated embodiment of the present disclosure, each second press-fit portion 325 defines a second elliptical hole 3251 so that the second press-fit portion 325 has certain elasticity. Therefore, it is convenient to press the second press-fit portion 325 into the corresponding conductive hole 301 of the circuit board 300 so as to achieve a reliable electrical connection with the circuit board 300.

In the illustrated embodiment of the present disclosure, the second insulating block 31 includes a first fixing block 311 and a second fixing block 312. The first fixing portions 322 are fixed to the first fixing block 311. For example, the first fixing portions 322 are insert-molded with the first fixing block 311. The second fixing portions 323 are fixed to the second fixing block 312, for example, the second fixing portions 323 are insert-molded with the second fixing block 312. The first fixing block 311 and the second fixing block 312 are separately arranged. The second fixing block 312 defines a notch 3121 through which the non-signal terminals 229 pass.

In the illustrated embodiment of the present disclosure, the over-molding insulating block 4 is over-molded on the first terminal module 2 and the second terminal module 3 so as to form an integral terminal module. This method is beneficial to conceal and fix sections of the tail portions 2281 which are adapted for being soldered with the cables 23 in the over-molding insulating block 4, thereby improving the structural strength. In the illustrated embodiment of the present disclosure, the over-molding insulating block 4 is provided with two protruding blocks 40 at a rear end. The cables 23 pass through the over-molding insulating block 4 backwardly from the protruding blocks 40.

Of course, it is understandable to those skilled in the art that the first conductive terminals 22 can also be fixed to the first insulating block 21 by other means such as assembling, and the second conductive terminals 32 can also be fixed to the second insulating block 31 by other means such as assembling. In some embodiments, the first insulating block 21, the second insulating block 31, and the over-molding insulating block 4 may not even be provided, and the first conductive terminals 22 and the second conductive terminals 32 are directly installed to the insulating body 1.

In the illustrated embodiment of the present disclosure, the metal shell 5 encloses the over-molding insulating block 4. The metal shell 5 includes a top wall 51, a rear wall 52 bent downwardly from a rear edge of the top wall 51, and two side walls 53 bent downwardly from opposite side edges of the top wall 51, respectively. The rear wall 52 and the two side walls 53 are buckled together to achieve fixation. The rear wall 52 and the two side walls 53 are provided with mounting feet 521, 531, respectively, for being pressed into the circuit board 300. In the illustrated embodiment of the present disclosure, the mounting feet 521, 531 are adapted to be pressed into the conductive holes 301 of the circuit board 300 so as to achieve a reliable electrical connection with the circuit board 300. In addition, front ends of the top wall 51 and the two side walls 53 are respectively provided with flanges 511, 532 bent outwardly. The flanges 511, 532 are adapted to contact the metal cage 6 so as to improve the grounding shielding effect. The two side walls 53 and the over-molding insulating block 4 are provided with locking holes 533 and locking protrusions 41 which are locked with each other. In the illustrated embodiment of the present disclosure, the locking holes 533 are provided on the two side walls 53, and the locking protrusions 41 are provided on the over-molding insulating block 4. Of course, in other embodiments, the locking holes 533 can also be provided on the over-molding insulating block 4, and the locking protrusions 41 can be provided on the two side walls 53. In the illustrated embodiment of the present disclosure, the rear wall 52 defines a first through hole 522 and a second through hole 523. The plurality of cables 23 are divided into two groups, in which a first group of cables 231 are soldered and fixed to parts of the second row of conductive pads 252, and a second group of cables 232 are soldered and fixed to remaining parts of the second row of conductive pads 252. The two protruding blocks 40 are clamped in the first through hole 522 and the second through hole 523, respectively, to achieve positioning. The first group of cables 231 pass through the rear wall 52 from the first through hole 522, and the second group of cables 232 pass through the rear wall 52 from the second through hole 523.

As shown in FIG. 1, the metal cage 6 includes a shielding cavity 61 which is in communication with the mating slot 12 and located at a front of the mating slot 12. The shielding cavity 61 is adapted for accommodating the mating connector. In the illustrated embodiment of the present disclosure, the metal cage 6 includes an opening 62 communicating with the shielding cavity 61 to facilitate observation of a mating state of the mating connector and the electrical connector. The metal cage 6 abuts against the flanges 511, 532 of the metal shell 5 so as to improve the grounding shielding effect.

Referring to FIGS. 2, 3, 10, 11 and 12, in the illustrated embodiment of the present disclosure, the electrical connector assembly includes four first electrical connectors 100 arranged on one side of the circuit board 300 and arranged in a single row, and one second electrical connector 200 arranged on an opposite side of the circuit board 300. The second electrical connector 200 and the corresponding first electrical connector 100 are arranged opposite to each other. However, the number and arrangement of the first electrical connector 100 and the second electrical connector 200 are not limited to this. In some embodiments, the number of the first electrical connectors 100 and the second electrical connectors 200 are the same. The first electrical connectors 100 and the second electrical connectors 200 are arranged opposite to each other in a one-to-one correspondence manner. In a set of the first electrical connector 100 and the second electrical connector 200 arranged opposite to each other, the plurality of second press-fit portions 325 of the first electrical connector 100 and the plurality of second press-fit portions 325 of the second electrical connector 200 are arranged alternately so as to form two rows of second press-fit portions 325 located in two planes. For example, the second press-fit portions 325 of the first electrical connector 100 and the second press-fit portions 325 of the second electrical connector 200 located in a same plane or a same row are arranged in a staggered manner along the second arrangement direction A2.

Compared with the prior art, in the present disclosure, by providing the tail portions 2281 electrically connected to the cables 23, the high-speed signal can realize data transmission through the cables 23. This avoids data transmission problems caused by importing the high-speed signals into the circuit board for transmission, thereby improving the quality of signal transmission. In addition, in the present disclosure, by displacing the second press-fit portions 325 along the second arrangement direction A2 of the second mating arm 321, the mutual influence between the second press-fit portions 325 can be effectively avoided, thereby facilitating the realization of the installation with the circuit board 300. In addition, referring to FIGS. 9 to 12, when the two electrical connectors and the circuit board 300 of the present disclosure adopt a back-to-back installation manner, the second press-fit portions 325 of the first electrical connector 100 and the second press-fit portions 325 of the second electrical connector 200 are arranged in a staggered manner with each other. This facilitates the installation of the first electrical connector 100 and the second electrical connector 200 with the circuit board 300.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body, the insulating body comprising a mating surface and a mating slot extending through the mating surface;

a plurality of first conductive terminals, each first conductive terminal comprising a first mating arm extending into the insulating body, the first mating arm comprising a first mating portion extending into the mating slot;

a plurality of second conductive terminals, each second conductive terminal comprising a second mating arm extending into the insulating body and a press-fit portion for being mounted to a circuit board, the second mating arm comprising a second mating portion extending into the mating slot, the first mating portion and the second mating portion being adapted to clamp a tongue plate of a mating connector so as to electrically contact with the mating connector;

wherein the plurality of second conductive terminals are arranged along an arrangement direction; and wherein any two adjacent second mating arms are aligned with each other along the arrangement direction, and any two adjacent press-fit portions are arranged in a staggered manner along the arrangement direction; and wherein the electrical connector further comprises a second terminal module which comprises an insulating block and the plurality of second conductive terminals fixed to the insulating block; the second mating arms and the press-fit portions extend beyond opposite sides of the insulating block, respectively; each second conductive terminal comprises a first fixing portion connected to the second mating arm, a second fixing portion bent from the first fixing portion, and a second bending portion bent from the second fixing portion, the press-fit portion extends from the second bending portion, the first fixing portion and the second fixing portion are fixed to the insulating block, any two adjacent first fixing portion and second fixing portion are aligned with each other in the arrangement direction, bending directions of any two adjacent second bending portions are opposite.

2. The electrical connector according to claim 1, wherein the second mating arms of the plurality of second conductive terminals are arranged in a single row along the arrangement direction; and wherein the press-fit portions of the plurality of second conductive terminals are arranged in two rows along the arrangement direction.

3. The electrical connector according to claim 1, wherein the insulating block comprises a first fixing block and a second fixing block, the first fixing portion is fixed to the first fixing block, the second fixing portion is fixed to the second fixing block, the first fixing block and the second fixing block are arranged separately.

4. An electrical connector, comprising:

an insulating body, the insulating body comprising a mating surface and a mating slot extending through the mating surface;

a plurality of first conductive terminals, each first conductive terminal comprising a first mating arm extending into the insulating body, the first mating arm comprising a first mating portion extending into the mating slot;

a plurality of second conductive terminals, each second conductive terminal comprising a second mating arm extending into the insulating body and a press-fit portion for being mounted to a circuit board, the second mating arm comprising a second mating portion extending into the mating slot, the first mating portion and the second mating portion being adapted to clamp a tongue plate of a mating connector so as to electrically contact with the mating connector;

wherein the plurality of second conductive terminals are arranged along an arrangement direction; and wherein any two adjacent second mating arms are aligned with each other along the arrangement direction, and any two adjacent press-fit portions are arranged in a staggered manner along the arrangement direction; and wherein the electrical connector further comprises a first terminal module which comprises a first insulating block and the plurality of first conductive terminals fixed to the first insulating block, the first mating arm extends beyond the first insulating block, the plurality of first conductive terminals comprise a group of signal terminals, each signal terminal comprises a tail portion; wherein the electrical connector further comprises a plurality of cables of which each cable is electrically connected to the tail portion.

5. The electrical connector according to claim 4, wherein the first mating arms of the plurality of first conductive terminals are arranged in a single row along another arrangement direction, the plurality of first conductive terminals further comprise a plurality of non-signal terminals, each non-signal terminal comprises another press-fit portion for being mounted to the circuit board, two adjacent another press-fit portions are arranged in a staggered manner along the another arrangement direction.

6. The electrical connector according to claim 5, wherein each non-signal terminal comprises a first extension portion connected to the first mating arm, a second extension portion bent from the first extension portion, and a first bending portion bent from the second extension portion, the another press-fit portion extends from the first bending portion, and bending directions of two adjacent first bending portions are opposite.

7. The electrical connector according to claim 6, further comprising a transfer circuit board which comprises a first row of conductive pads and a second row of conductive pads electrically connected with the first row of conductive pads; wherein the first row of conductive pads are connected to the tail portions of the group of signal terminals, and the second row of conductive pads are connected to the plurality of cables.

8. The electrical connector according to claim 1, further comprising a metal cage enclosing the insulating body, the metal cage comprising a shielding cavity which is in communication with the mating slot and located in front of the mating slot.

9. An electrical connector assembly, comprising:

a circuit board;

a first electrical connector; and a second electrical connector, the first electrical connector and the second electrical connector being mounted to opposite sides of the circuit board;

each of the first electrical connector and the second electrical connector comprising:

an insulating body, the insulating body comprising a mating surface and a mating slot extending through the mating surface;

a plurality of first conductive terminals, each first conductive terminal comprising a first mating arm extending into the insulating body, the first mating arm comprising a first mating portion extending into the mating slot;

a plurality of second conductive terminals, each second conductive terminal comprising a second mating arm extending into the insulating body and a press-fit portion for being mounted to a circuit board, the second mating arm comprising a second mating portion extending into the mating slot, the first mating portion and the second mating portion being adapted to clamp a tongue plate of a mating connector so as to electrically contact with the mating connector;

wherein the plurality of second conductive terminals are arranged along an arrangement direction; and wherein any two adjacent second mating arms are aligned with each other along the arrangement direction, and any two adjacent press-fit portions are arranged in a staggered manner along the arrangement direction;

wherein the press-fit portions of the first electrical connector and the press-fit portions of the second electrical connector located in a same plane are arranged alternately along the arrangement direction; and wherein the electrical connector further comprises a first terminal module which comprises a first insulating block and the plurality of first conductive terminals fixed to the first insulating block, the first mating arm extends beyond the first insulating block, the plurality of first conductive terminals comprise a group of signal terminals, each signal terminal comprises a tail portion;

wherein each of the first electrical connector and the second electrical connector further comprises a plurality of cables of which each cable is electrically connected to the tail portion.

10. The electrical connector assembly according to claim 9, wherein the second mating arms of the plurality of second conductive terminals are arranged in a single row along the arrangement direction; and wherein the press-fit portions of the plurality of second conductive terminals are arranged in two rows along the arrangement direction.

11. The electrical connector assembly according to claim 9, further comprising a second terminal module which comprises an insulating block and the plurality of second conductive terminals fixed to the insulating block; the second mating arms and the press-fit portions extending beyond opposite sides of the insulating block, respectively; each second conductive terminal comprising a first fixing portion connected to the second mating arm, a second fixing portion bent from the first fixing portion, and a second bending portion bent from the second fixing portion, the press-fit portion extending from the second bending portion, the first fixing portion and the second fixing portion being fixed to the insulating block, any two adjacent first fixing portion and second fixing portion being aligned with each other in the arrangement direction, bending directions of any two adjacent second bending portions being opposite.

12. The electrical connector assembly according to claim 11, wherein the insulating block comprises a first fixing block and a second fixing block, the first fixing portion is fixed to the first fixing block, the second fixing portion is fixed to the second fixing block, the first fixing block and the second fixing block are arranged separately.

13. The electrical connector assembly according to claim 9, wherein the first mating arms of the plurality of first conductive terminals are arranged in a single row along another arrangement direction, the plurality of first conductive terminals further comprise a plurality of non-signal terminals, each non-signal terminal comprises another press-fit portion for being mounted to the circuit board, two adjacent another press-fit portions are arranged in a staggered manner along the another arrangement direction.

14. The electrical connector assembly according to claim 13, wherein each non-signal terminal comprises a first extension portion connected to the first mating arm, a second extension portion bent from the first extension portion, and a first bending portion bent from the second extension portion, the another press-fit portion extends from the first bending portion, and bending directions of two adjacent first bending portions are opposite.

15. The electrical connector assembly according to claim 14, further comprising a transfer circuit board which comprises a first row of conductive pads and a second row of conductive pads electrically connected with the first row of conductive pads; wherein the first row of conductive pads are connected to the tail portions of the group of signal terminals, and the second row of conductive pads are connected to the plurality of cables.

16. The electrical connector assembly according to claim 9, further comprising a metal cage enclosing the insulating body, the metal cage comprising a shielding cavity which is in communication with the mating slot and located in front of the mating slot.

17. The electrical connector assembly according to claim 9, wherein the circuit board comprises a first surface and a second surface disposed opposite to the first surface;

wherein the first electrical connector is mounted on a first side of the circuit board with the press-fit portions of the first electrical connector extending through the first surface and at least extending beyond the second surface; and wherein the second electrical connector is mounted on a second side of the circuit board with the press-fit portions of the second electrical connector extending through the second surface and at least extending beyond the first surface.

* * * * *